Oct. 23, 1923.
H. WOOD
1,471,437
PRIMARY EDUCATIONAL APPLIANCE
Filed Nov. 16, 1921
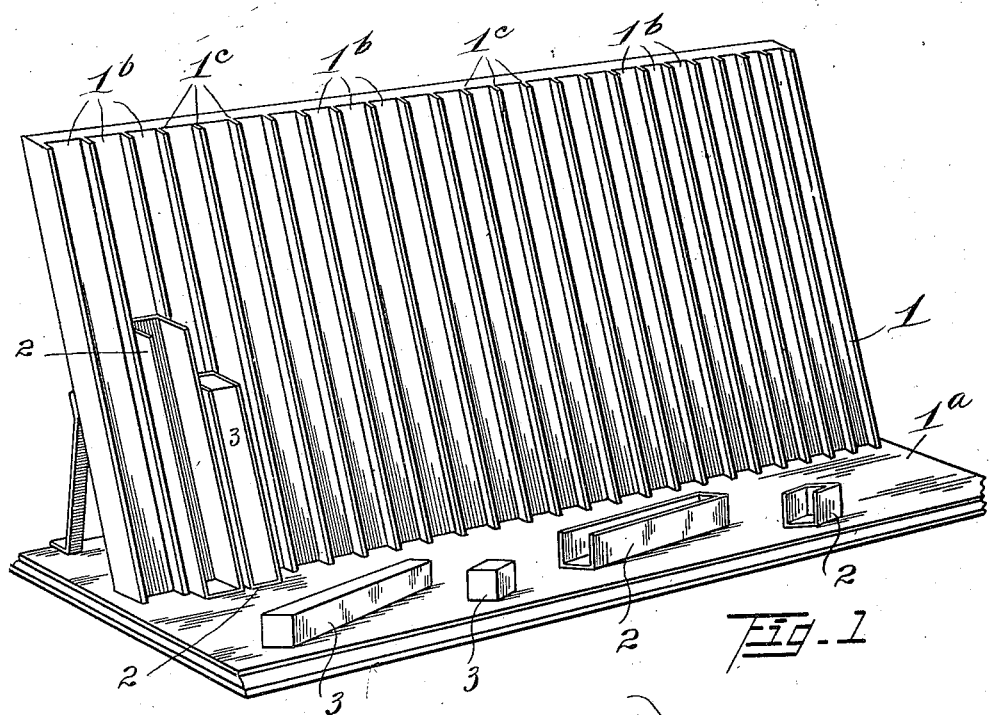
Fig. 1
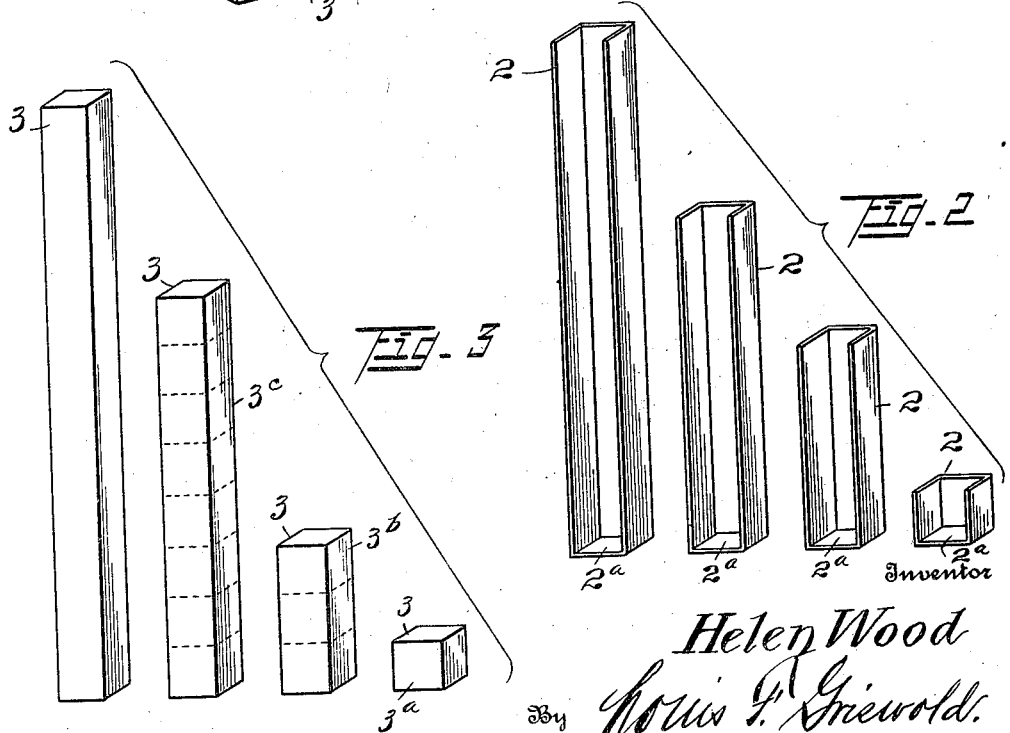
Fig. 2
Fig. 3
Inventor
Helen Wood
By Norris P. Griswold.
Attorney Patented Oct. 23, 1923.

1,471,437

UNITED STATES PATENT OFFICE.

HELEN WOOD, OF CLEVELAND, OHIO.

PRIMARY EDUCATIONAL APPLIANCE.

Application filed November 16, 1921. Serial No. 515,688.

*To all whom it may concern:*

Be it known that I, HELEN WOOD, a citizen of the United States, residing at Cleveland, in the county of Cuyahoga and State of Ohio, have invented certain new and useful Improvements in Primary Educational Appliances, of which the following is a specification.

This invention relates to a primary educational appliance and has for its object the provision of a device of this character wherewith the fundamental arithmetical operations may be objectively demonstrated to children, or primary pupils.

It is an authentic fact that the immature, or undeveloped mind is more susceptible to material objects which present quantity, than it is to characters, such as figures, which have merely quantity significance, therefore the fundamental principles of quantity calculations are readily grasped when demonstrated to a child by object lessons.

The present invention provides for the development of quantity thinking by exercising the senses of sight and touch. It enables the child to readily conceive the relation of quantites by providing a material objective unit of a given size as a basis, or elementary unit, and a series of unitary objects of different sizes proportionate to the elementary unit. By proper arrangement of the unitary objects the pupil will appreciate each member as a unit having its individual relative size. It makes possible the combining of smaller units into a large unit whole in such a manner that the pupil conceives the construction of the larger unit. It enables the pupil to analyze each unit, from one to an indefinite greater number, into its component units, or parts. The use of the appliance also enables the primary, or child pupil, to understand what component unit remains when another component unit is removed from the larger unit whole, and to readily see how a given larger unit whole may be resolved into its equal component units, and to readily observe what part the smaller unit is of the larger unit whole of which it is one or more of the equal component parts. The appliance further provides for the elimination of hap-hazard guessing, or finger counting on the part of a child pupil.

I have devised an appliance of simple construction for conveniently demonstrating, or accomplishing these objects. An embodiment of the said appliance is illustrated in the accompanying drawing which is made part of the specification, and to facilitate the understanding of the appliance I have employed similar reference characters to designate corresponding parts throughout the description and in said drawing.

Fig. 1 is a perspective view of a rack used as a support for numerous block-holders and the blocks carried therein.

Fig. 2 illustrates a number of the block-holders, and Fig. 3 shows a variety of blocks which are employed.

In the embodiment of the invention as illustrated 1 represents a support having a flat base element $1^a$ on which is mounted an upright rack which, for convenience, is preferably inclined backward from the base upward. This rack provides a series of compartments, or parallel vertical channels $1^b$, equally spaced by division members $1^c$. These channels are designed for the accommodation of a series of holder elements 2 of various lengths which may be made of light sheet metal of channel formation open at the top, and closed at the bottom as shown at $2^a$. The holders 2 provide carriers, or retainers for blocks 3 of different sizes, as more fully set forth hereinafter.

The blocks 3 are of uniform transverse dimensions, preferably square, but are of different lengths. An elementary unit block of a predetermined size being adopted, the length of each and all the blocks employed is a certain proportion to the length of the elementary unit. For the purpose of clarifying the explanation, assume one inch square as the elementary unit. The present embodiment provides a capacity of twenty-four rack compartments of an equal height of say twenty-four inches. In this instance a total of eighty-seven blocks and twenty-four holders are used. The holders range in height from one inch to and including twenty-four inches, while the blocks are in series as follows:—Twenty-four 1 inch high, twelve 2 inches, eight 3 inches, six 4 inches, five 5 inches, four 6 and four 7 inches high, three 8 and three 9 inches, two each 10, 11 and 12 inches, and one each of 13, 14, 15, 16, 17, 18, 19, 20, 21, 22, 23 and 24 inches in height.

Referring to Fig. 3 the dotted lines denote that block $3^b$ is three times as long as block $3^a$, and that block $3^c$ is eight times as long as block $3^a$. The holders are likewise proportioned, as shown in Fig. 2, in sequence multiples of the elementary unit.

The blocks 3 are adapted to fit in the holders 2, and are displayed by arranging the holders in the rack 1, as shown in Fig. 1.

The primary stage of instruction by means of the improved appliance includes the prevailing upon the child to arrange the blocks in the holders, or to build up, take down, and compare various combinations. This is easily brought about as it is more or less amusing to the child. This amusement interests him so that it impresses on his mind the results of the different combinations and these results are object demonstrations of the fundamental arithmetical operations.

The following are examples of various operations.

(a) The pupil arranges a 3 inch block beside a 3 inch holder and then places a 2 inch and a 1 inch block in the holder, this shows him that the combined quantity of the 2 inch unit and the 1 inch unit is equal to the 3 inch unit, or that 2 and 1 equal 3.

(b) In an 8 inch holder the pupil places a 5 inch block and a 3 in block, he is then told to remove the 3 inch block, and he observes that the 5 inch block remains, which denotes that a 3 inch unit taken from an 8 inch unit leaves a 5 inch unit, and that 5 and 3 equal 8.

(c) A two inch unit is placed in a 10 inch holder and the pupil fills the holder with other 2 inch units, he then sees that 5 of the 2 inch units completely fill the 10 inch holder, and therefore, is made aware that 5 times 2 equals 10.

(d) Removing the 2 inch units which have been placed in the 10 inch holder, and separating them, the pupil is made to understand that the 10 inches is made up of 5 equal units, or 2 inch blocks, and that 10 may be divided into 5 twos.

(e) Beside a 3 inch block the pupil places three 1 inch blocks in a 3 inch holder, and observes 3 as a unit whole, removing one of the three blocks he sees that he has taken $\frac{1}{3}$ of the whole unit, and by removing two of the blocks he has taken $\frac{2}{3}$ of the whole unit.

The above are but a few of the innumerable simple problems, or primary arithmetical operations that may be objectively demonstrated by the arrangement of the blocks and holders. Various combinations may be exhibited in the rack, where comparisons may be made, and the different operations explained by teachers to classes, or individual pupils.

While the present embodiment of the appliance provides for 24 holders, 87 blocks, and a supporting rack 24 units high and having 24 compartments, it will be understood that these quantities are arbitrary, that the capacity of the appliance may be increased, or decreased, that the elementary unit block may be of different dimensions than that specified, with the multiple unit blocks dimensioned accordingly, and that there may be other changes, or diversions from the foregoing specification without departing from the spirit of the invention or the scope of the claims.

Having described my invention, what I claim and desire to secure by Letters Patent is:

1. In an educational appliance, a series of blocks of uniform given dimensions which are used as elementary units, and a series of blocks having transverse dimensions equal to those of the elementary units and having different length dimensions of increasing sequence multiples of the length dimension of an elementary unit block, the second series comprising groups of different lengths, a determined number of blocks being twice the length of an elementary unit block, a determined number being three times the length of an elementary block, and so on indefinitely in sequence, there being a determined number of like blocks in each group and the length dimensions of the blocks in each group being a multiple of the length dimension of an elementary block, and a series of holders for the blocks, said holders being of different lengths corresponding to the lengths of the blocks in both the first, and second series.

2. In an educational appliance, a series of blocks of uniform given dimensions which are used as elementary units, and a series of blocks having transverse dimensions equal to those of the elementary units and having different length dimensions of increasing sequence multiples of the length dimension of an elementary unit block, the second series comprising groups of different lengths, a determined number of blocks being twice the length of an elementary unit block, a determined number being three times the length of an elementary block, and so on indefinitely in sequence, there being a determined number of like blocks in each group and the length dimensions of the blocks in each group being a multiple of the length dimension of an elementary unit block, a series of holders for the blocks, said holders being of different lengths corresponding to the lengths of the blocks in both the first, and second series, and a supporting rack provided with a series of open compartments in which the holders are adapted to slide for displaying said holders and the blocks carried therein.

In testimony whereof I affix my signature.

HELEN WOOD.